Figure 3:
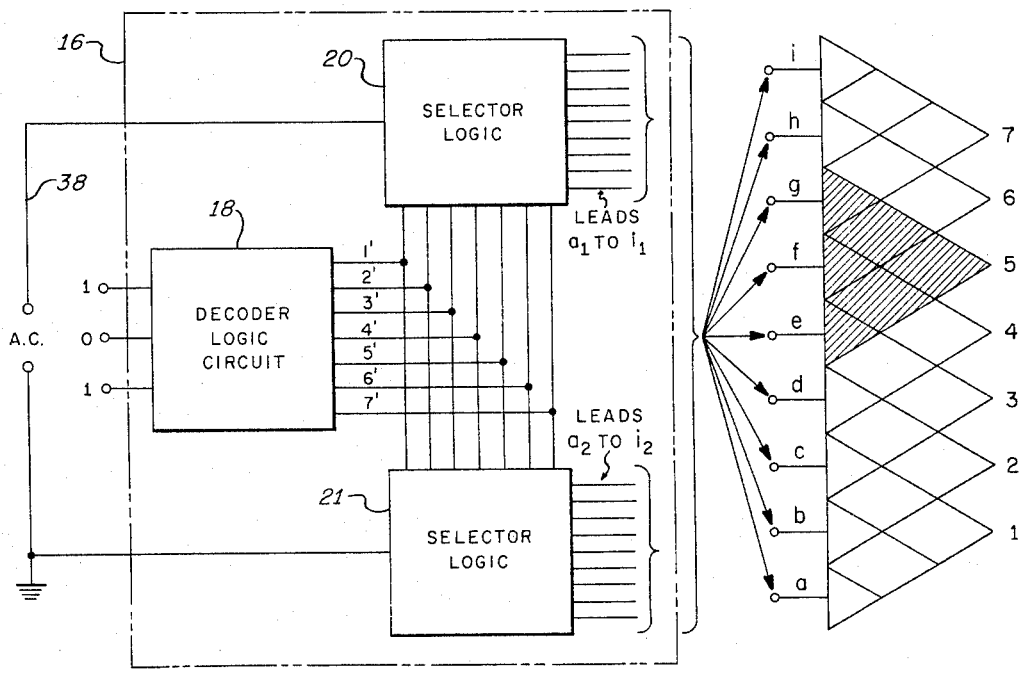
Figures 5A, 5B:
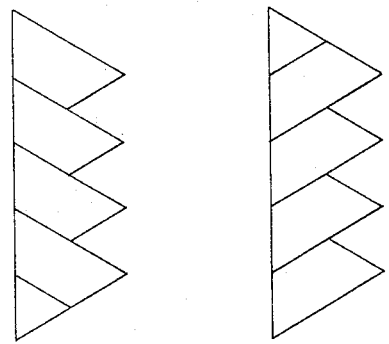

Sept. 27, 1966    P. G. YIOTIS    3,275,871
DISPLAY APPARATUS
Filed Feb. 17, 1964    3 Sheets-Sheet 1
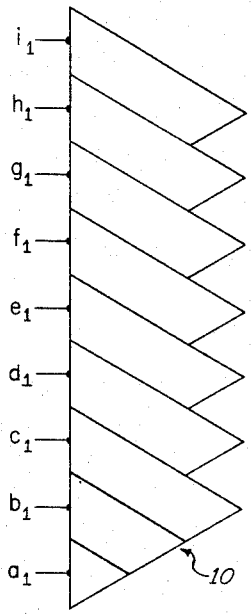
FIG.1a.
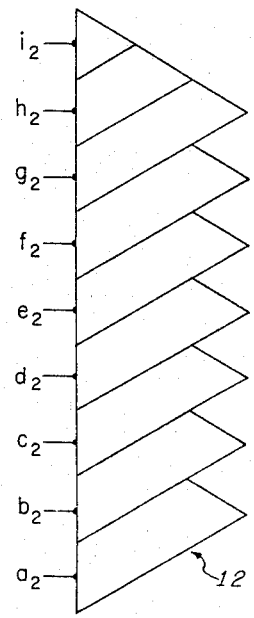
FIG.1b.
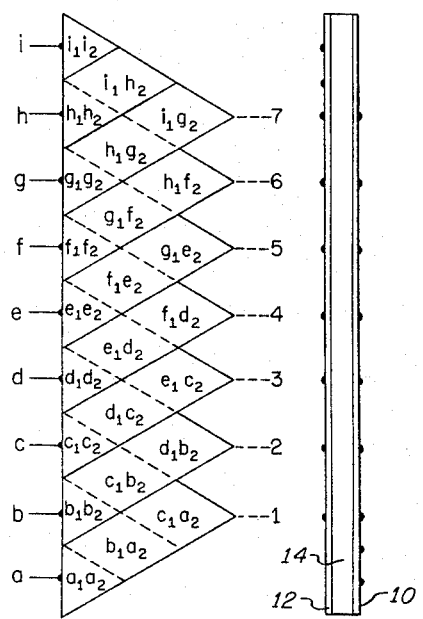
FIG.1c.    FIG.1d.
TRUTH TABLE
| INPUT CODE | DECIMAL INDICATION | LEAD EXCITATION |
|---|---|---|
| 0  0  1 | 1 | a b c |
| 0  1  0 | 2 | b c d |
| 0  1  1 | 3 | c d e |
| 1  0  0 | 4 | d e f |
| 1  0  1 | 5 | e f g |
| 1  1  0 | 6 | f g h |
| 1  1  1 | 7 | g h i |
FIG.2.
INVENTOR.
PETER G. YIOTIS
BY
S.C.Seaton
ATTORNEY Sept. 27, 1966    P. G. YIOTIS    3,275,871
DISPLAY APPARATUS
Filed Feb. 17, 1964    3 Sheets-Sheet 2

INVENTOR.
PETER G. YIOTIS
BY
ATTORNEY

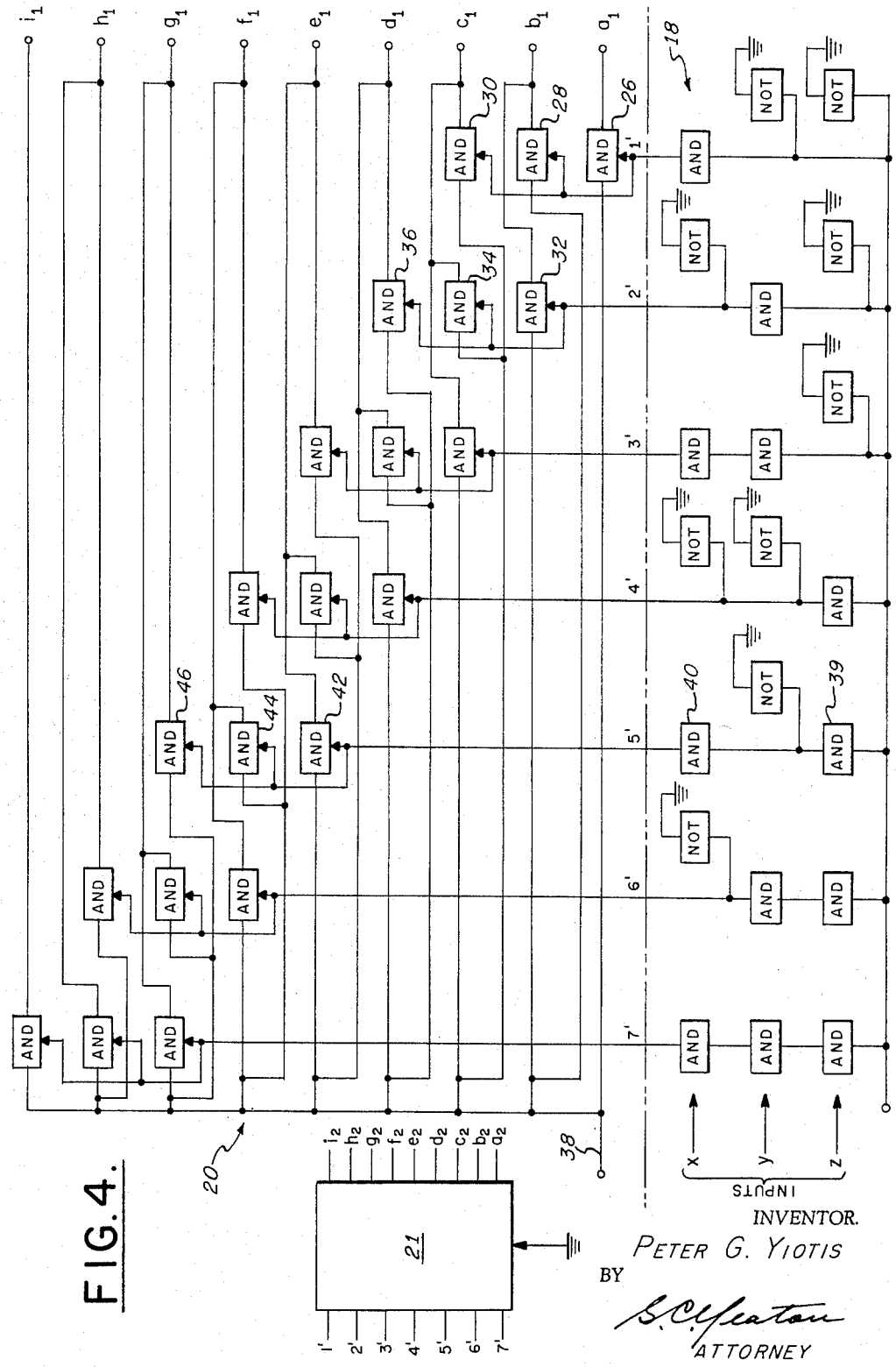

United States Patent Office 3,275,871
Patented Sept. 27, 1966

3,275,871
DISPLAY APPARATUS
Peter G. Yiotis, Astoria, N.Y., assignor to Sperry Rand Corporation, Great Neck, N.Y., a corporation of Delaware
Filed Feb. 17, 1964, Ser. No. 345,327
8 Claims. (Cl. 313—108)

The present invention relates in general to indicating apparatus and in particular provides an electroluminescent display generally of the type described in copending application Serial No. 208,219, now Patent No. 3,221,169.

With prior art electroluminescent type display apparatus, indications of signal magnitude are usually made by means of an enlargeable display bar or, if preferred, by means of a positionable reference line. While such displays are useful in many applications, it is nevertheless oftentimes desirable to display signal magnitude by means of a positionable arrowhead movable along a reference set of calibrated gradations. The present invention affords such a display indication, and does so solely by means of electroluminescent display techniques and without exotic shaping of excitable electroluminescent elements. The arrowhead may be of any practical size, and the ability of the arrowhead to "point" to a designated gradation, i.e. the resolving ability of the display, is unimpaired by the size of the arrowhead itself.

In providing the display of the present invention, use is made of the fact that while two geometric configurations have identically the same perimeters, they may nevertheless be composed of entirely different assemblies of smaller geometric configurations. For example, in one form of the invention a first geometric configuration having a toothed side comprises a plurality of conductive sections, one side of each section forming a complete side of a different tooth. Atop the first geometric configuration is a second configuration identically like the first and so placed that only the teeth of the two configurations perfectly overlay each other (the second configuration being however this time comprised of a plurality of transparent conductive sections formed, for example, as described in U.S. Patent 3,046,540) with the sides of the sections of the two configurations being in a crosshatched arrangement. In other words, the conductive sections of the two configurations are not oriented in the same direction, even though their respective teeth overlay each other. Between the two geometric layers an electroluminescent layer is deposited, a logic circuit being then employed to excite selectively groups of overlaid conductive sections, whereby a glowing positionable arrowhead may appear shining through the geometric configuration consisting of transparent conductive sections in accordance with output signals from the logic circuit.

A principal object of the invention is to provide electroluminescent dispaly apparatus for indicating signal magnitude by means of an arrowhead.

Another object of the invention is to provide electroluminescent display apparatus that has an arrowhead marker positionble in response to output signals from computing apparatus.

Another object of the invention is to provide positionable arrowhead marker means provided by electroluminescent display techniques and movable in accordance with digital computer output signals.

Another object of the invention is to provide electroluminescent display apparatus that indicates signal magnitude by means of an arrowhead positionable in accordance therewith, and with high resolution regardless of arrowhead size.

The invention will be described with reference to the figures wherein:

FIGS. 1a through 1d are diagrams useful in showing the construction of positionable arrowhead display apparatus embodying the invention, FIG. 2 is a truth table provided to show the logic needed to practice the invention in accordance with the apparatus depicted by FIGS. 1a through 1d, FIG. 3 is a block diagram showing generally one form of the invention, FIG. 4 is a schematic diagram of a logic circuit for use in practicing the embodiment of the invention depicted in FIG. 3, and FIGS. 5a and 5b, and 6a and 6b, are diagrams showing how the invention may be adapted for different forms of arrowhead displays.

Referring now to FIGS. 1a through 1d, a first planar geometric configuration 10 having a plurality of electrically conductive quadrangularly shaped sections, each of which is electrically excitable by respective input leads $a_1$ through $i_1$, has such sections arranged to provide a toothed side to the configuration 10. The conductive sections are all electrically insulated from each other. A second geometric configuration 12 formed exactly like the first planar geometric configuration 10, but having its sections formed of transparent electrically conductive material, has its sections all electrically excitable by means of respective input leads $a_2$ through $i_2$. The two configurations are inverted with respect to each other so that the quadrangularly shaped sections of the configuration 10 run in directions different from those of the corresponding configuration 12 sections.

A layer of electroluminescent material is provided on the face of the configuration 10 as shown by FIG. 1d, and such layer is then sandwiched between the configurations 10 and 12, with the toothed sides of the two configurations being brought into coincidence. See FIG. 1c, which figure also shows the leads $a$ through $i$ without subscripts since the left hand sides of corresponding, but differently oriented, sections are also coincidental, the coinciding teeth of the two sections "pointing" in this embodiment toward reference numerals 1 through 7.

Apparent from FIG. 1c is that sections of the electroluminescent layer may be selectively illuminated by selectively exciting pairs or groups of pairs of the leads $a_1$ through $i_1$ and $a_2$ through $i_2$. For example, by exciting leads $a_1$ and $a_2$ the section of electroluminescent material nearest the bottom of FIG. 1c is illuminated; also, to illuminate the section of electroluminescent material nearest the top of FIG. 1c the leads $i_1$ and $i_2$ are excited; to illuminate the section of electroluminescent material nearest the reference numeral 5 requires that the leads $g_1$ and $e_2$ be excited. As a corollary to the foregoing, illumination of a full arrowhead that points, for example, at reference numeral "5" requires that the leads $e_1$, $f_1$ and $g_1$, and $e_2$, $f_2$ and $g_2$, be simultaneously excited.

Referring now to FIG. 2, a truth table is shown indicating lead excitation for production of arrowheads that point to the typified reference numerals 1–7 of FIG. 1c, a binary input code for exciting such leads being shown also. That is, a three-bit binary input code may be employed to produce seven signal conditions, which signal condition may then logically select and excite appropriate indicator leads for arrowhead generation. The block diagram of FIG. 3 shows generally the mechanization of the FIG. 2 truth table, and specifically shows the conversion by means of a logic circuit 16 of a binary input of 101 (representative of the decimal number 5) to an arrowhead indication that points to the number that 101 represents, to wit, reference numeral "5."

A presently preferred form of logic circuit 16 is shown in FIG. 4 and includes three general signal handling sections, viz. a binary-to-decimal decoder 18 and identical selector logic circuits 20 and 21 for selective excitation of groups of leads $a_1$ through $i_1$ and $a_2$ through $i_2$. The decoder 18 is conventional in design and employs AND gates (which are all symbolized by blocks) in three rows for respectively three input bit orders $x$, $y$ and $z$, leads carrying such bit orders to each of the blocks in a respective row being omitted deliberately for purposes of clarity in the figure. The decoder AND gates are logically arranged and serially connected to form seven columns, with electrical signals being applied continually to each column via a lead 24. Hence, when all AND gates in a given column are excited by respective input bits, electrical signals (depending on the states of cooperating NOT-function circuits) are applied to excite one of the decoder output leads $1'$–$7'$.

Each decoder output lead is adapted to apply (in each of the selector logic circuits 20 and 21) the signal it has thereon to a respective group of three AND gates connected in parallel, with each group of three gates being adapted to excite three of nine selector logic circuit output leads, and each group of three leads for each selector logic circuit being displaced from an adjacent group by a single lead. That is, a first group of three AND gates designated 26, 28 and 30 in the selector logic circuit 20 is adapted to excite leads $a_1$, $b_1$ and $c_1$, a second group of three AND gates designated 32, 34 and 36 is adapted to excite leads $b_1$, $c_1$ and $d_1$, etc. Electrical power is brought by means of a lead 38 to each of the AND gates in the selector logic 20, the logic circuit 21 receiving power from the opposite side of the source of electrical power. See FIG. 3.

To see how, for example, the display arrowhead of FIG. 3 is provided, consider signals being applied to the bit orders, $x$ and $z$, i.e. 101 being applied to the binary-to-decimal decoder 18. Instantly, an electrical signal is applied from the lead 24 to only the decoder output lead $5'$ via AND gates 39 and 40. When this happens, AND gates 42, 44 and 46 in the selector logic 20 open to allow power to pass through them respectively to the output leads $e_1$, $f_1$ and $g_1$, corresponding AND gates in the selector circuit 21 also opening to excite the leads $e_2$, $f_2$ and $g_2$. With such leads connected to the geometric configurations 10 and 12 as taught by FIG. 1c, the display of FIG. 3 is provided.

Figures 6A, 6B:
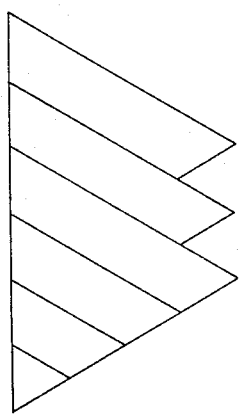

While the invention has been described in only one form, it obviously may be employed in many other modifications. Arrowhead size, for example, may be reduced as shown by the two configurations of FIGS. 5a and 5b; or, if preferred, arrowhead size may be enlarged as shown by FIGS. 6a and 6b. In either of these cases, the logic selector circuit must be modified, e.g. to excite respectively groups of only two AND gates or to excite groups of four AND gates. Also, an additional input bit order, for example, may be added, but this would require another eight groups of selector AND gates, with attendant provision for an additional eight arrowhead configurations. And again, the geometric configurations employed to provide the respective arrowhead may be so arranged that such respective arrowheads are oriented in different directions.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Display apparatus comprising first substantially planar transparent conductive material having a toothed edge formed by adjacent sides of said material, second substantially planar conductive material having an edge like the toothed edge of said first substantially planar material, said second substantially planar conductive material being arranged to lie in a plane parallel to the plane of said first planar material with both said edges substantially completely overlapping each other, and illuminable planar means situated between said first and second planar means responsive to potential differences between said first and second planar means to illuminate.

2. Display apparatus comprising first and second substantially planar transparent conductive means each of which has an angularly shaped edge formed by adjacent sides of said means, the angularly shaped edges pointing in respective directions with respect to a reference, third and fourth substantially planar conductive means each having an edge shaped substantially like respectively the edges of said first and second substantially planar means, said third and fourth substantially planar conductive means being arranged to lie in a plane parallel to the planes of said first and second planar means with the edges of said first and third and the edges of said second and fourth means substantially overlapping each other completely, and illuminable planar means situated between said first and third and said second and fourth planar means responsive to potential differences between those pairs of means.

3. Display apparatus comprising a first two sections of transparent conductive material arranged in a first plane, one section having a substantially parallel pair of sides which is itself substantially parallel with respect to one side of the other section so as to orient both sections in a first direction, a second two sections of conductive material like said first two sections and arranged in a second plane parallel to said first plane, one section of said second two sections overlapping one section of said first two sections and the sections of said second two sections being so disposed that they are oriented in a second direction, and illuminable means overlapped by said first and second two sections responsive to potential differences between the sections that overlap each other.

4. The apparatus of claim 3 wherein said illuminable means is a plane of electroluminescent material situated between said first and second three sections of conductive material.

5. The apparatus of claim 4 including means to excite selectively both sections of said first two sections and either of the sections of said second two sections.

6. Display apparatus comprising a first plurality of substantially parallel transparent conductive strips in a first plane, said strips being skewed with respect to a reference plane, the side of each strip farthest from the reference plane forming an angle with respect to the reference plane, a second plurality of substantially parallel conductive strips in a second plane parallel to said first plane, said second plurality of strips being of such lengths and so skewed with respect to the reference plane that sides of these strips lie in planes with respective sides of the strips of said first plurality of strips, the farthest sides of the strips of said second plurality of strips forming different angles with respect to the reference plane than the aforesaid angles formed by said first plurality of strips, and planar means situated between said first and second planes responsive to voltage differentials applied between opposing strips of said first and second pluralities to illuminate said planar means in the regions where respective electrically excitable strips of said first and second pluralities overlap.

7. The apparatus of claim 6 wherein said planar means is a coating of electroluminescent material.

8. The apparatus of claim 6 including means to excite selectively groups of adjacent strips of said first plurality of strips and to excite selectively groups of adjacent strips of said second plurality of strips which overlap the selectively excited strips of said first plurality of strips.

References Cited by the Examiner

UNITED STATES PATENTS

| | | | |
|---|---|---|---|
| 2,987,485 | 6/1961 | Froelich | 252—301.6 |
| 3,072,821 | 1/1963 | Yando | 315—55 |
| 3,182,415 | 5/1965 | Brooks | 40—130 |
| 3,211,663 | 10/1965 | Buleza | 252—301.1 |
| 3,235,736 | 2/1966 | Frankl | 250—213 |

MAYNARD R. WILBUR, *Primary Examiner.*

W. J. ATKINS, JR., *Assistant Examiner.*